(12) United States Patent
Plee et al.

(10) Patent No.: US 12,199,287 B2
(45) Date of Patent: Jan. 14, 2025

(54) ANODE FOR LI-ION BATTERY

(71) Applicant: Arkema France, Colombes (FR)

(72) Inventors: Dominique Plee, Colombes (FR); Fabrice Domingues Dos Santos, Colombes (FR); Gregory Schmidt, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 747 days.

(21) Appl. No.: 17/263,721

(22) PCT Filed: Jul. 25, 2019

(86) PCT No.: PCT/FR2019/051842
§ 371 (c)(1),
(2) Date: Jan. 27, 2021

(87) PCT Pub. No.: WO2020/021204
PCT Pub. Date: Jan. 30, 2020

(65) Prior Publication Data
US 2021/0376329 A1 Dec. 2, 2021

(30) Foreign Application Priority Data

Jul. 27, 2018 (FR) ..................................... 1857007

(51) Int. Cl.
| H01M 4/62 | (2006.01) |
| C08F 214/22 | (2006.01) |
| C08L 27/16 | (2006.01) |
| H01M 4/04 | (2006.01) |
| H01M 4/134 | (2010.01) |
| H01M 4/1395 | (2010.01) |
| H01M 4/36 | (2006.01) |
| H01M 4/38 | (2006.01) |
| H01M 10/0525 | (2010.01) |

(52) U.S. Cl.
CPC ......... *H01M 4/628* (2013.01); *C08F 214/222* (2013.01); *C08L 27/16* (2013.01); *H01M 4/0402* (2013.01); *H01M 4/134* (2013.01); *H01M 4/1395* (2013.01); *H01M 4/366* (2013.01); *H01M 4/382* (2013.01); *H01M 10/0525* (2013.01); *C08L 2203/206* (2013.01); *C08L 2205/025* (2013.01)

(58) Field of Classification Search
CPC .... H01M 4/628; H01M 4/0402; H01M 4/134; H01M 4/1395; H01M 4/366; H01M 4/382; H01M 10/0525; C08F 214/222; C08L 27/16; C08L 2203/206; C08L 2205/025
See application file for complete search history.

(56) References Cited

U.S. PATENT DOCUMENTS

| 7,641,974 B2 * | 1/2010 | Kent .................. C08F 14/22 516/77 |
| 8,343,388 B2 | 1/2013 | Lee et al. |
| 10,727,478 B2 | 7/2020 | Chae et al. |
| 2002/0182488 A1 * | 12/2002 | Cho .................. H01M 10/052 429/231.95 |
| 2004/0072066 A1 | 4/2004 | Cho et al. |
| 2004/0131945 A1 * | 7/2004 | Zushi ................ H01M 10/0587 429/231.1 |
| 2015/0303464 A1 * | 10/2015 | Watanabe ........... H01M 10/052 429/231.5 |
| 2016/0372743 A1 * | 12/2016 | Cho ........................ H01M 4/62 |
| 2017/0149057 A1 | 5/2017 | Sugita et al. |
| 2019/0112453 A1 * | 4/2019 | Kim ........................ C09C 1/407 |
| 2019/0273287 A1 | 9/2019 | Merlo et al. |

FOREIGN PATENT DOCUMENTS

| CN | 1489229 A | | 4/2004 |
| JP | 2002-313345 A | | 10/2002 |
| JP | 2002313345 | * | 10/2002 |
| JP | 2009529762 A | | 8/2009 |
| KR | 20110082289 A | | 7/2011 |
| KR | 10-2018-0041086 A | | 4/2018 |
| WO | 2011/002097 A1 | | 1/2011 |
| WO | 2017/140649 A1 | | 8/2017 |
| WO | 2017/196105 A1 | | 11/2017 |
| WO | WO2017196105 | * | 11/2017 |
| WO | 2018/054715 A | | 3/2018 |

OTHER PUBLICATIONS

JP 2002313345 MT (Year: 2002).*
Office Action (Notice of Reasons for Refusal) issued on May 29, 2023, by the Japanese Patent Office in corresponding Japanese Patent Application No. 2021-504419, and an English Translation of the Office Action. (8 pages).
International Search Report (PCT/ISA/210) with translation and Written Opinion (PCT/ISA/237) mailed on Oct. 2, 2019, by the European Patent Office as the International Searching Authority for International Application No. PCT/FR2019/051842.

* cited by examiner

*Primary Examiner* — Alexander Usyatinsky
(74) *Attorney, Agent, or Firm* — Buchanan Ingersoll & Rooney PC

(57) ABSTRACT

The invention relates to an anode for a Li-ion rechargeable battery, said anode being covered with a protective film based on fluorinated copolymer(s). The invention also relates to the processes for preparing this anode. The invention also relates to a Li-ion rechargeable battery comprising an anode according to the invention. The invention lastly relates to the use of fluorinated copolymer(s) as film for covering an anode for a lithium-ion battery comprising a negative electrode active material.

17 Claims, No Drawings

ANODE FOR LI-ION BATTERY

FIELD OF THE INVENTION

The present invention relates generally to the field of electrical energy storage in lithium rechargeable batteries of Li-ion type. More specifically, the invention relates to an anode for a Li-ion rechargeable battery, said anode comprising a protective film based on fluorinated copolymer(s). The invention also relates to the processes for preparing this anode. The invention lastly relates to a Li-ion rechargeable battery comprising an anode according to the invention.

TECHNICAL BACKGROUND

The usual lithium-ion batteries comprise flammable liquid electrolytes based on solvents and lithium salts. Given the increasing use of batteries of this type in the field of electronic consumer products such as computers, tablets or mobile phones (smartphones), but also in the field of transportation especially with electric vehicles, improving the safety and reducing the manufacturing cost of these lithium batteries have become major challenges. These batteries use graphite anodes into which the Li ions are inserted when charging. The compound which is formed is $C_6Li$, i.e. one Li equivalent per 72 g of graphite.

It has long been known that the replacement of graphite by a Li metal anode will enable a significant increase in the energy density, but the main challenge for the use of anodes made of lithium metal relates to the formation of Li dendrites during the reduction of the metal, which may involve a low coulombic efficiency, an increase in cell volume, an acceleration of the decomposition of the electrolyte, a perforation of the separator and therefore short circuits and a thermal runaway.

It is possible to stabilize the interfaces using additives, or to heal the deposits by agents that act as shields or else by blocking the growth mechanically with ceramics.

The stabilization of the Li anode would have an advantage, both for batteries based on solvent/salt pairs, and for batteries based on solid polymer electrolytes (SPEs), with no liquid solvent, thus avoiding the use of flammable liquid components like in conventional Li-ion batteries and enabling the production of batteries that are thinner and possibly more flexible.

Thus, a solution is proposed in the publication "*Dendrite-Free Lithium Deposition for Lithium Metal Anodes with Interconnected Microsphere Protection*" by Yong-Gun Lee et al, Chem. Mater., 2017, 29 (14), pp 5906-5914. This document describes a Li metal anode protected by microspheres of polystyrene-co-divinylbenzene P(S-DVB). These microspheres guide the ions towards specific zones and exert a mechanical pressure on the dendrites during their growth.

In another approach proposed by Y. Liu and Y. Cui in the publication "*Lithium Metal Anodes: A Recipe for Protection*" published in Joule 1, 2017, p. 643-650, a protective layer may be formed during the operation of the battery to form an SEI (Solid Electrolyte Interface). This interface is an ion conductor formed by a mixture of $Li_2S_6$ and $P_2S_5$ (denoted as LSPS), complexed to yield a unique polymeric species in dimethoxyethane (DME). The additive is reduced on the surface of the Li metal, and gives a dense layer of $Li_3PS_4$. The amorphous nature of this material is critical for a good protection. The SEI is uniform and compact without a high defect density.

The two aforementioned methods are complicated to implement. The microspheres must have a high homogeneity of size and of crosslinking to prevent regions of weakness where the dendrites could exert pressure. The structure of $Li_3PS_4$ must also be well controlled to provide the best protection. This control is not easy. Furthermore, this structure is very sensitive to moisture and oxygen and the handling thereof is tricky.

Ding et al. in the publication "*Dendrite-Free Lithium Deposition via Self-Healing Electrostatic Shield Mechanism*" published in J. Am. Chem. Soc. 2013, 135, 4450-4456 proposed an electrostatic self-healing mechanism to reduce the formation of lithium dendrites by means of cations, the reduction potential of which cations is lower than Li/Li+ (Rb, Cs). These cations accumulate in the vicinity of the first Li clusters creating an electrostatic shield. This shield disfavours the growth of new lithium atoms on the clusters already present. This means that the lithium layer has a better quality and is smoother. The drawbacks of this method are a low coulombic efficiency due to the poor SEI (solid electrode interface) and the cost and availability of Rb and Cs.

Another solution for stabilizing the interface with the anode is covering the electrode with polymers or solid layers. The publication by I. S. Kang et al. "*Improved Cycling Stability of Lithium Electrodes in Rechargeable Lithium Batteries*" published in J. Electrochem. Soc. 2014, 161, A53-A57 describes the application of a layer of poly (3,4-ethylenedioxythiophene)-co-poly(ethylene glycol) copolymer on a Li metal anode.

Document KR20110082289 describes a Li-ion battery in which a polymer film containing a lithium powder is placed between an electrode and a separator. Said film is prepared by applying a solution, in which the lithium metal is dispersed in a polymer binder solution, on the electrode, followed by a drying step. The binder solution is prepared by dissolving, in a nonaqueous solvent, at least one of the following polymers:

a fluorine-based polymer, an acrylic polymer, an SBR (styrene-butadiene) rubber and a polyacrylonitrile-based polymer.

However, these approaches are based on confinement and do not change the intrinsic behaviour of the growth of the dendrites.

There is therefore a need to provide an anode for a Li-ion rechargeable battery that is protected by an effective means against the formation of dendrites and is compatible with industrial implementation.

The objective of the invention is therefore to solve at least one of the drawbacks of the prior art, namely the formation of dendrites, notable in particular in the case of high charge/discharge rates.

The invention also aims to provide processes for manufacturing these anodes that are stabilized by means of a deposition of a fluorinated copolymer film. Finally, the invention aims to provide Li-ion rechargeable batteries comprising stabilized anodes.

SUMMARY OF THE INVENTION

The invention relates firstly to a negative electrode (or anode) for a lithium-ion battery, comprising a current collector and a layer of negative electrode active material covered with a film of fluorinated copolymer(s). The term "fluorinated copolymer" comprises the copolymers and the terpolymers described below.

Characteristically, said film comprises at least one of the following copolymers:

a copolymer comprising vinylidene fluoride and trifluoroethylene units of formula P(VDF-TrFE), or a copolymer comprising vinylidene fluoride and tetrafluoroethylene units of formula P(VDF-TFE), or a fluorinated terpolymer chosen from:

the terpolymer comprising vinylidene fluoride, trifluoroethylene and chlorotrifluoroethylene units of formula P(VDF-TrFE-CTFE), the terpolymer comprising vinylidene fluoride, trifluoroethylene and chlorotrifluoroethylene units of formula P(VDF-TrFE-CTFE), the terpolymer comprising vinylidene fluoride, trifluoroethylene and hexafluoropropylene units of formula P(VDF-TrFE-HFP), the terpolymer comprising vinylidene fluoride, tetrafluoroethylene and 1,1-chlorofluoroethylene units of formula P(VDF-TFE-CFE), the terpolymer comprising vinylidene fluoride, tetrafluoroethylene and chlorotrifluoroethylene units of formula P(VDF-TFE-CTFE), the terpolymer comprising vinylidene fluoride, tetrafluoroethylene and hexafluoropropylene units of formula P(VDF-TFE-HFP).

According to various embodiments, said anode comprises the following features, if need be combined.

According to one embodiment, said film comprises a blend of P(VDF-TrFE) copolymer with the P(VDF-TFE) copolymer.

According to one embodiment, said film comprises a blend of P(VDF-TrFE) copolymer with one of the aforementioned terpolymers.

According to one embodiment, said film comprises a blend of P(VDF-TFE) copolymer with one of the aforementioned terpolymers.

According to one embodiment, said film comprises a blend of two terpolymers chosen from those listed above.

The negative electrode active material is an alkali metal. According to one embodiment, the negative electrode active material is lithium.

According to one embodiment, said film has a thickness ranging from 1 to 14 μm, preferably from 1 to 10 μm, and more preferentially between 2 and 10 μm, limits included.

According to one embodiment, said film has a density ranging from 1.2 to 2 $g/cm^3$.

The invention also relates to a process for manufacturing a negative electrode comprising a layer of negative electrode active material covered with a film of fluorinated copolymer (s) as described above. This process comprises a step of depositing or forming a film of fluorinated copolymer(s) on the surface of said negative electrode active material.

According to one embodiment, the formation of the film takes place via a solvent route, by evaporation of the solvent from a solution of fluoridated copolymer(s).

According to one embodiment, the deposition of the film takes place via a dry route that consists in preparing a fluorinated film on a suitable support and in transferring this fluorinated film onto the layer of negative electrode active material.

Another subject of the invention is a Li-ion rechargeable battery comprising said negative electrode, a positive electrode and an electrolyte.

Another subject of the invention is the use of a copolymer chosen from:

the copolymer comprising vinylidene fluoride and trifluoroethylene units of formula P(VDF-TrFE), the copolymer comprising vinylidene fluoride and tetrafluoroethylene units of formula P(VDF-TFE), and a fluorinated terpolymer chosen from: the terpolymer comprising vinylidene fluoride, trifluoroethylene and chlorofluoroethylene units of formula P(VDF-TrFE-CFE), the terpolymer comprising vinylidene fluoride, trifluoroethylene and chlorotrifluoroethylene units of formula P(VDF-TrFE-CTFE), the terpolymer comprising vinylidene fluoride, trifluoroethylene and hexafluoropropylene units of formula P(VDf-TrFE-HFP), the terpolymer comprising vinylidene fluoride, tetrafluoroethylene and chlorofluoroethylene units of formula P(VDF-TFE-CFE), the terpolymer comprising vinylidene fluoride, tetrafluoroethylene and chlorotrifluoroethylene units of formula P(VDF-TFE-CTFE), and the terpolymer comprising vinylidene fluoride, tetrafluoroethylene and hexafluoropropylene units of formula P(VDf-TFE-HFP), or a blend chosen from: the blend of P(VDF-TrFE) copolymer with the P(VDF-TFE) copolymer; the blend of P(VDF-TrFE) copolymer with one of the aforementioned terpolymers; the blend of P(VDF-TFE) copolymer with one of the aforementioned terpolymers, and the blend of two terpolymers among the aforementioned ones;

as film for covering an anode for a lithium-ion battery comprising a negative electrode active material, in order to inhibit the formation of lithium dendrites within the negative electrode active material.

The present invention makes it possible to overcome the disadvantages of the state of the art. It provides more particularly an anode that is stabilized owing to the presence of a film of fluorinated copolymer(s) deposited at the surface of the negative electrode active material, said film inhibiting the formation of dendrites within the negative electrode active material. It is particularly suitable for the manufacture of lithium-ion rechargeable batteries, said negative electrode active material of which is lithium. The stability of this electrode improves the performance and the service life of the batteries.

DESCRIPTION OF EMBODIMENTS OF THE INVENTION

The invention is now described in greater detail and in a nonlimiting manner in the description which follows.

According to a first aspect, the invention relates to a negative electrode for a lithium-ion battery, comprising a current collector and a layer of negative electrode active material covered with a film of fluorinated copolymer(s). Characteristically, said film comprises at least a copolymer comprising vinylidene fluoride and trifluoroethylene units of formula P(VDF-TrFE), or a copolymer comprising vinylidene fluoride and tetrafluoroethylene units of formula P(VDF-TFE), or a fluorinated terpolymer chosen from: the terpolymer comprising vinylidene fluoride, trifluoroethylene and 1,1-chlorofluoroethylene units of formula P(VDF-TrFE-CFE), the terpolymer comprising vinylidene fluoride, trifluoroethylene and chlorotrifluoroethylene units of formula P(VDF-TrFE-CTFE), the terpolymer comprising vinylidene fluoride, trifluoroethylene and hexafluoropropylene units of formula P(VDf-TrFE-HFP), the terpolymer comprising vinylidene fluoride, tetrafluoroethylene and chlorofluoroethylene units of formula P(VDF-TFE-CFE), the terpolymer comprising vinylidene fluoride, tetrafluoroethylene and chlorotrifluoroethylene units of formula P(VDF-TFE-CTFE), and the terpolymer comprising vinylidene fluoride, tetrafluoroethylene and hexafluoropropylene units of formula P(VDf-TFE-HFP), or a blend of one of said copolymers with one of said terpolymers, or a blend of two copolymers or a blend of two terpolymers.

The negative electrode active material may be an alkali metal, an alkline-earth metal or an element from the boron group. The negative electrode active material claimed in the present invention is an alkali metal.

According to various embodiments, said anode comprises the following features, if need be combined.

According to one embodiment, said negative electrode active material is lithium.

According to one embodiment, said film has a thickness ranging from 1 to 14 µm, preferably from 1 to 10 micrometres, and more preferentially from 2 to 10 µm, limits included. The thickness of the fluorinated film must be limited, to avoid creating an interface impedance prejudicial to a power operation of the battery. With films that are too thick, the diffusion of the lithium is slowed down.

According to one embodiment, said fluorinated film has a density ranging from 1.2 to 2 g/cm$^3$.

According to one embodiment, said fluorinated film is a porous film with a pore size between 100 nm and 1 µm.

The presence of the fluorinated film on the layer of negative electrode active material makes it possible to prevent, or at least to greatly reduce the formation of lithium dendrites. The copolymers or terpolymers targeted are naturally polar: FE phase (ferroelectric phase for the copolymers) and/or RFE phase (relaxor ferroelectric phase for the terpolymers), which are similar to the beta phase obtained for PVDF under very particular conditions (for example, by film drawing or dissolving in specific solvents and slow evaporation or addition of additives, which solutions are not compatible with industrial applicable processes). Without wishing to go into technical details, the applicant believes that the polarity of the fluorinated film obtained from the copolymers and terpolymers described is sufficient to enable an orientation of the lithium cations in a plane parallel to the collector and to the film of Li metal, rather than in a perpendicular direction which would favour the formation of dendrites.

The invention is therefore based on the use of a fluorinated copolymer or terpolymer or on a blend thereof, in the form of film deposited on the surface of a negative electrode active material. The term "fluorinated" is understood to mean a polymer comprising –F groups.

Preferably, the copolymers and terpolymers are ferroelectric or relaxor ferroelectric polymers. Ferroelectric copolymers or terpolymers have a large hysteresis of the polarization curve (charge vs applied field) with a high coercive field (typically of the order of 20 V/µm, or even 50 V/µm) and a high remanent polarization (typically of the order of 60 mC/m$^2$). The relaxor terpolymers or copolymers have a low coercive field (typically less than 10 V/µm), a low remanent polarization (typically less than 20 mC/m$^2$) or even none, a high saturated polarization (typically of the order of 60 mC/m$^2$ or even 70 mC/m$^2$) and a maximum dielectric permittivity as a function of the temperature dependent on the frequency of the electric field.

Furthermore, another advantage is that of the higher permittivity of the copolymers and especially of the terpolymers which makes it possible to obtain a more pronounced polarization at the interface with the lithium and a more pronounced dissociation of the electrolytes.

The relative dielectric permittivity at 23° C. and 1 kHz of the copolymers and terpolymers is greater than 10. The maximum dielectric permittivity as a function of the temperature is at least 30 or even 40. The relative dielectric permittivity may be measured by dielectric spectroscopy.

The Curie temperature of the P(VDF-TrFE) copolymer is between 50° C. and 140° C. The Curie temperature of the polymers of the invention may be measured by differential scanning calorimetry or by dielectric spectroscopy.

According to one embodiment, in the copolymer of formula P(VDF-TrFE), the proportion of units derived from trifluoroethylene is less than 55 mol % and greater than 18 mol % relative to the sum of the units derived from vinylidene fluoride and from trifluoroethylene.

According to one embodiment, in the copolymer of formula P(VDF-TFE), the proportion of units derived from tetrafluoroethylene is less than 60 mol % and greater than 10 mol % relative to the sum of the units derived from vinylidene fluoride and from tetrafluoroethylene.

The copolymers and terpolymers of the invention can be produced by using any known process, such as emulsion polymerization, microemulsion polymerization, suspension polymerization and solution polymerization. For the terpolymers, the use of the process described in document WO 2010/116105 is particularly preferred. This process makes it possible to obtain terpolymers of high molecular weight and of suitable structuring.

According to one embodiment, the weight-average molar mass, which in the context of this patent application is also denoted by "molecular weight" (Mw), of the terpolymer has a value of 200 000 to 1 500 000 g/mol, preferably of 250 000 to 1 000 000 g/mol, and more particularly of 300 000 to 700 000 g/mol.

The latter can be adjusted by modifying certain parameters of the process, such as the temperature in the reactor, or by adding a transfer agent.

The molecular weight distribution can be estimated by SEC (size exclusion chromatography) with dimethylformamide (DMF) as eluent, with a set of 3 columns of increasing porosity. The stationary phase is a styrene-DVB gel. The detection method is based on a measurement of the refractive index, and the calibration is carried out with polystyrene standards. The sample is dissolved at 0.5 g/l in DMF and filtered through a 0.45 µm nylon filter.

The molecular weight can also be evaluated by measurement of the melt flow index (MFI) at 230° C. under a load of 10 kg according to ASTM D1238 (ISO 1133). The MFI is between 0.1 and 100, preferably between 0.5 and 50 and more particularly between 1 and 10.

Moreover, the molecular weight can also be characterized by a measurement of the viscosity in solution according to the standard ISO 1628. Methyl ethyl ketone (MEK) is a preferred solvent of the terpolymers for the determination of the viscosity index.

More generally, the molar composition of the terpolymers of the invention can be determined by various means. The conventional methods for elemental analysis of carbon, fluorine and chlorine or bromine elements result in a system of two or three independent equations having two independent unknowns (for example % VDF and % TrFE, with % Y=100−(% VDF+% TrFE)), which makes it possible to unambiguously calculate the composition by weight of the polymers, from which the molar composition is deduced.

Use may also be made of multinuclear, in this instance proton ($^1$H) and fluorine ($^{19}$F), NMR techniques, by analysis of a solution of the polymer in an appropriate deuterated solvent. The NMR spectrum is recorded on an FT-NMR spectrometer fitted with a multinuclear probe. The specific signals given by the different monomers in the spectra produced according to one or other nucleus are then located. Thus, for example, the TrFE (CFH=CF$_2$) unit gives, in proton NMR, a specific signal characteristic of the CFH group (at approximately 5 ppm). It is the same for the $CH_2$ groups of the VDF (broad unresolved peak centred at 3 ppm). The relative integration of the two signals gives the relative abundance of the two monomers, that is to say the VDF/TrFE molar ratio.

The combination of the relative integrations of the various signals obtained in proton NMR and in fluorine NMR results in a system of equations, the resolution of which results in the molar concentrations of the various monomer units being obtained.

Finally, it is possible to combine the elemental analysis, for example for the heteroatoms, such as chlorine or bromine, and the NMR analysis. Thus, the content of CTFE or of CFE can be determined by a measurement of the chlorine content by elemental analysis.

A person skilled in the art thus has available a range of methods or combinations of methods allowing him to determine, without ambiguity and with the necessary accuracy, the composition of the terpolymers of the invention.

According to one embodiment, the molar ratio of the VDF units to the TrFE or TFE units in the terpolymers has a value of from 85/15 to 30/70 and preferably of from 75/25 to 40/60.

According to one embodiment, the proportion of units derived from the CFE, HFP or CTFE monomer is from 1 to 15 mol %, more preferably from 1 to 12 mol %, relative to all of the units of a terpolymer.

According to one embodiment, the fluorinated copolymer or terpolymer may contain an additional unit, introduced during the radical polymerization, between 0.1 and 10 mol %, preferably between 0.2 and 8 mol % and particularly between 0.5 and 5 mol %. This additional unit makes it possible to improve certain particular properties of the film, such as the adhesion with the introduction of functional units of acid, alcohol, glycidyl, phosphonate type such as trifluoromethacrylic acid, without degrading its electroactive properties.

According to one embodiment, the fluorinated copolymer or terpolymer may be functionalized. That is to say chemically modified after the polymerization step in order to introduce chemical functions along the polymer chain enabling for example the crosslinking of the film, for example with a terpolymer bearing azide functions, or improving the adhesion of the film on the electrode, for example with a terpolymer bearing associative functions such as imidazolidinyl, triazolyl, triazinyl, bisureyl, ureidopyrimidyl groups.

The copolymers of formula P(VDF-TrFE) or P(VDF-TFE) are compatible with the terpolymers listed above and having a Curie temperature different from that of the terpolymer. The term "compatible" is understood to mean that the blend of the two polymers forms a homogeneous phase with a single glass transition temperature.

According to one embodiment, when the fluorinated film deposited on said negative electrode active material is formed of a blend of copolymer and terpolymer, these are present in a weight ratio of from 50:50 to 1:99, preferably of from 45:55 to 1:99, more particularly preferably of from 40:60 to 5:95.

According to an embodiment, said film also comprises compatible polymers of acrylic and/or methacrylic type. These have the effect of stabilizing the film, of facilitating the adhesion or of enabling the crosslinking.

According to a second aspect, the invention relates to a process for manufacturing a negative electrode comprising a layer of negative electrode active material covered with a film of fluorinated copolymer(s) as described above. This process comprises a step of depositing or forming a film of fluorinated copolymer(s) on the surface of said negative electrode active material.

According to one embodiment, the deposition of the film takes place via a solvent route. The solvent-route method consists in dissolving the fluorinated copolymers and/or fluorinated terpolymers in a solvent or a mixture of solvents which does not damage the anode, in particular if it is made of Li metal. Specifically, many solvents, including ketones or esters, damage the Li metal via a chemical reaction.

The copolymers and terpolymers based on vinylidene fluoride and trifluoroethylene are soluble in a large number of solvents. Unlike the PVDF homopolymer, they crystallize easily to give polar (ferroelectric or relaxor ferroelectric) phases from solutions. They thus make it possible to simply, rapidly and inexpensively produce deposits that inhibit the formation of dendrites.

The solvents used in the invention are selected from the group consisting of carbonates, carbamates, nitriles, amides, sulfoxides (such as dimethyl sulfoxide), sulfolane, nitromethane, 1,3-dimethyl-2-imidazolidinone, 1,3-dimethyl-3,4,5,6-tetrahydro-2(1,H)-pyrimidinone, 3-methyl-2-oxazolidinone, and mixtures thereof.

Among the nitriles, mention may for example be made of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile, and mixtures thereof.

Among the carbonates, mention may for example be made of cyclic carbonates such as for example ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), methyl ethyl carbonate (EMC) (CAS: 623-53-0), diphenyl carbonate (CAS 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC), vinylene carbonate (VC) (CAS: 872-36-6), fluoroethylene carbonate (FEC) (CAS: 114435-02-8), trifluoropropylene carbonate (CAS: 167951-80-6) or mixtures thereof.

These solvents advantageously have a dielectric constant of greater than or equal to 1, over a range of temperatures between 0 and 100° C., preferably between 10-80° C. and advantageously between 15-70° C. The dielectric permittivity measurement may be carried out using a Sefelec LCR 819 LCR meter which makes it possible to measure a capacitance which is proportional to the permittivity.

The step of depositing, in film form, the solution of copolymer and/or terpolymer and solvent(s) on the negative electrode active material is followed by a step of evaporating the solvent (drying the film). After drying, according to one embodiment, said film has a thickness ranging from 2 to 14 μm, preferably from 2 to 10 micrometres, limits included.

According to one embodiment, the deposition of the film takes place via a dry route that consists in preparing a fluorinated film on a suitable support and in transferring this fluorinated film onto the layer of negative electrode active material. The transfer of the fluorinated film takes place by any mechanical process, which may be by means of a roller or by lamination, followed by pressing with a heat supply that does not exceed 100° C.

According to one embodiment, the solution contains co-crosslinking agents such as (meth)acrylic monomers that are bifunctional or polyfunctional in terms of reactive double bonds; bifunctional or polyfunctional primary amines; bifunctional or polyfunctional compounds bearing azide functions; organic peroxides; bifunctional or polyfunctional allyl compounds. After the deposition in film form, the process according to the invention comprises a step of crosslinking the film thermally, between 30° C. and 200° C., preferably between 50° C. and 180° C. and particularly between 60° C. and 160° C.; or radiatively, preferably with ultraviolet radiation and particularly with a wavelength between 250 and 405 nm. After crosslinking the film, the latter is insoluble in some or all of these solvents that can be used to produce the solution, giving the crosslinked film a particular advantage since the use of the electrolyte is no longer limited by the solubility of the film.

Another subject of the invention is a Li-ion rechargeable battery comprising said negative electrode, a positive electrode and an electrolyte.

EXAMPLES

The following examples nonlimitingly illustrate the scope of the invention.

The samples were heated to 100° C. and maintained at this temperature for 3 minutes to eliminate their thermal history. The products were then cooled to −80° C. and then heated to 200° C. at a rate of between 5° C./min and 20° C./min.

Example 1 (Comparative)

A button cell is assembled with a Li metal anode, a 25 μm thick PP separator and a cathode containing 2% PVDF, 5% Ketjen Black and 93% NMC 111 ($LiNi_{0.33}Mn_{0.33}Co_{0.32}O_2$). The electrolyte is 1M LiFSI as a mixture with EMC/EC (7/3 by vol.).

The cycling is carried out at 2C in charge and discharge between 3 and 4.2 volts for 300 cycles.

Example 2

A solution of P(VDF-TrFE) copolymer with a molar composition of 80% VDF and 20%

TrFE in a 3/7 by volume EC/EMC mixture is prepared. Next, an amount of liquid sufficient to obtain, after drying, a film of 4 microns is deposited on a Li metal foil in a glovebox. A relatively rapid evaporation of the copolymer solution is carried out.

A button cell is assembled with the Li anode treated with the fluorinated copolymer, a 25 μm thick PP separator and a cathode containing 2% PVDF, 5% Ketjen Black and 93% NMC 111 ($LiNi_{0.33}Mn_{0.33}Co_{0.32}O_2$). The electrolyte is 1M LiFSI as a mixture with EMC/EC (7/3 by vol.).

The cycling is carried out at 2C in charge and discharge between 3 and 4.2 volts for 300 cycles.

Example 3

The two button cells are disassembled in a glovebox and the Li anodes are examined by scanning electron microscopy (SEM). The anode treated with the fluorinated copolymer of Example 2 has very few beginnings of dendrites, of which the size is less than 50 nm, and a low surface density.

The untreated anode from comparative Example 1 has dendrites, of which the surface density is much greater and the length is between a few nm and around 1 micron.

Example 4

A solution of P(VDF-TrFE-CTFE) terpolymer in dimethoxyethane is prepared. The molar ratio of the VDF units to the TrFE units is equal to 67% and the molar proportion of CTFE is equal to 8%. Next, an amount of liquid sufficient to obtain, after drying, a nonporous 4 μm film is deposited on a Li metal foil in a glovebox. A relatively rapid evaporation of the copolymer solution is carried out.

A button cell is assembled with the Li anode treated with the fluorinated terpolymer, a 25 μm thick PP separator and a cathode containing 2% PVDF, 5% Ketjen Black and 93% NMC 111 ($LiNi_{0.33}Mn_{0.33}Co_{0.32}O_2$). The electrolyte is 1M LiFSI as a mixture with EMC/EC (7/3 by vol.).

The cycling is carried out at 2C in charge and discharge between 3 and 4.2 volts for 100 cycles.

Example 5

The button cell from Example 4 is disassembled in a glove box and the Li anode is examined by scanning electron microscopy (SEM). The anode treated with the fluorinated terpolymer of Example 4 has very few beginnings of dendrites, of which the size is less than 12-13 nm, and a very low surface density. The examination shows that the terpolymer appears to be more effective than the copolymer from Example 2.

Example 6

A solution of P(VDF-TrFE) copolymer with a molar composition of 80% VDF and 20% TrFE in 1,3-dioxolane is prepared. It is then deposited on a glass support, left to dry for the time needed to eliminate the solvent, then the fluorinated copolymer film is detached and applied mechanically in a glovebox to a Li metal strip. A pressure of 1 MPa is applied to the assembly at a temperature of 60° C. and a manipulable fluorinated film-Li anode composite is obtained. A button cell is assembled with the Li anode treated with the fluorinated copolymer, a 25 μm thick PP separator and a cathode containing 2% PVDF, 5% Ketjen Black and 93% NMC 111 ($LiNi_{0.33}Mn_{0.33}Co_{0.32}O_2$). The electrolyte is 1M LiFSI as a mixture with EMC/EC (7/3 by vol.). The cycling is carried out at 2C in charge and discharge between 3 and 4.2 volts for 100 cycles.

The button cell is disassembled in a glovebox and the Li anode is examined by scanning electron microscopy (SEM). The treated anode has very few beginnings of dendrites, of which the size is less than 50 nm, and having a low surface density.

The invention claimed is:

1. Anode for lithium-ion battery, comprising a negative electrode active material, said anode being covered with a film comprising at least one copolymer chosen from:
    the copolymer comprising vinylidene fluoride and trifluoroethylene units of formula P(VDF-TrFE),
    the copolymer comprising vinylidene fluoride and tetrafluoroethylene units of formula P(VDF-TFE), and
    a fluorinated terpolymer chosen from: the terpolymer comprising vinylidene fluoride, trifluoroethylene and chlorofluoroethylene units of formula P(VDF-TrFE-CFE), the terpolymer comprising vinylidene fluoride, trifluoroethylene and chlorotrifluoroethylene units of formula P(VDF-TrFE-CTFE), the terpolymer comprising vinylidene fluoride, trifluoroethylene and hexafluoropropylene units of formula P(VDf-TrFE-HFP), the terpolymer comprising vinylidene fluoride, tetrafluoroethylene and chlorofluoroethylene units of formula P(VDF-TFE-CFE), the terpolymer comprising vinylidene fluoride, tetrafluoroethylene and chlorotrifluoroethylene units of formula P(VDF-TFE-CTFE), and the terpolymer comprising vinylidene fluoride, tetrafluoroethylene and hexafluoropropylene units of formula P(VDf-TFE-HFP), or a blend chosen from: the blend of P(VDF-TrFE) copolymer with the P(VDF-TFE) copolymer; the blend of P(VDF-TrFE) copolymer with one of the aforementioned terpolymers; the blend of P(VDF-TFE) copolymer with one of the aforementioned terpolymers, and the blend of two terpolymers among the aforementioned ones;

in which the negative electrode active material is an alkali metal.

2. Anode according to claim 1, in which the negative electrode active material is lithium.

3. Anode according to claim 1, in which said film has a thickness ranging from 1 to 14 μm, limits included.

4. Anode according to claim 1, in which said film has a density ranging from 1.2 to 2 g/cm$^3$.

5. Anode according to claim 1, in which, when the fluorinated film deposited on said negative electrode active material is formed of a blend of a copolymer and a terpolymer, these are present in a weight ratio of from 50:50 to 1:99.

6. Anode according to claim 1, in which, in the copolymer of formula P(VDF-TrFE), the proportion of units derived from trifluoroethylene is less than 55 mol % and greater than 18 mol % relative to the sum of the units derived from vinylidene fluoride and from trifluoroethylene.

7. Anode according to claim 1, in which, in the copolymer of formula P(VDF-TFE), the proportion of units derived from tetrafluoroethylene is less than 60 mol % and greater than 10 mol % relative to the sum of the units derived from vinylidene fluoride and from tetrafluoroethylene.

8. Anode according to claim 1, in which the molar ratio of the VDF units to the TrFE or TFE units in the terpolymers has a value of from 85/15 to 30/70.

9. Anode according to claim 1, in which the proportion of units derived from the CFE, HFP or CTFE monomer is from 1 to 15 mol %, relative to all of the units of a terpolymer.

10. Process for manufacturing a negative electrode comprising a layer of negative electrode active material covered with a film of fluorinated copolymer(s) according to claim 1, said process comprising a step of depositing said film of fluorinated copolymer(s) on the surface of said negative electrode active material.

11. Process according to claim 10, in which the deposition of the film takes place via a solvent route.

12. Process according to claim 10 comprising a step consisting in dissolving the fluorinated copolymer or the fluorinated terpolymers in a solvent selected from the group consisting of carbonates, carbamates, nitriles, amides, sulfoxides, sulfolane, nitromethane, 1,3-dimethyl-2-imidazolidinone, 1,3-dimethyl-3,4,5,6-tetrahydro-2 (1,H)-pyrimidinone, 3-methyl-2-oxazolidinone, and mixtures thereof.

13. Process according to claim 10, in which the deposition of the film takes place via a dry route.

14. Li-ion rechargeable battery comprising the negative electrode according to claim 1, a positive electrode and an electrolyte.

15. A film for covering an anode for a lithium-ion battery comprising a negative electrode active material, the film comprising a copolymer chosen from:

the copolymer comprising vinylidene fluoride and trifluoroethylene units of formula P(VDF-TrFE), the copolymer comprising vinylidene fluoride and tetrafluoroethylene units of formula P(VDF-TFE), and a fluorinated terpolymer chosen from: the terpolymer comprising vinylidene fluoride, trifluoroethylene and chlorofluoroethylene units of formula P(VDF-TrFE-CFE), the terpolymer comprising vinylidene fluoride, trifluoroethylene and chlorotrifluoroethylene units of formula P(VDF-TrFE-CTFE), the terpolymer comprising vinylidene fluoride, trifluoroethylene and hexafluoropropylene units of formula P(VDf-TrFE-HFP), the terpolymer comprising vinylidene fluoride, tetrafluoroethylene and chlorofluoroethylene units of formula P(VDF-TFE-CFE), the terpolymer comprising vinylidene fluoride, tetrafluoroethylene and chlorotrifluoroethylene units of formula P(VDF-TFE-CTFE), and the terpolymer comprising vinylidene fluoride, tetrafluoroethylene and hexafluoropropylene units of formula P(VDf-TFE-HFP), or of a blend chosen from: the blend of P(VDF-TrFE) copolymer with the P(VDF-TFE) copolymer; the blend of P(VDF-TrFE) copolymer with one of the aforementioned terpolymers; the blend of P(VDF-TFE) copolymer with one of the aforementioned terpolymers, and the blend of two terpolymers among the aforementioned ones;

wherein the film is configured to inhibit the formation of lithium dendrites within the negative electrode active material.

16. Anode according to claim 1, wherein the at least one copolymer has a melt flow index between 0.1 and 100.

17. The film according to claim 15, wherein the copolymer has a melt flow index between 0.1 and 100.

* * * * *